United States Patent
Donovan

(10) Patent No.: US 10,158,858 B2
(45) Date of Patent: Dec. 18, 2018

(54) METHOD AND SYSTEM FOR INDEX COMPRESSION FOR FIXED BLOCK SIZE TEXTURE FORMATS AND FOR NON-LINEAR INTERPOLATION OF INDEX VALUES ALONG AN EDGE IN A TILE

(71) Applicant: NVIDIA Corporation, Santa Clara, CA (US)

(72) Inventor: Walter Donovan, Saratoga, CA (US)

(73) Assignee: Nvidia Corporation, Santa Clara, CA (US)

( * ) Notice: Subject to any disclaimer, the term of this patent is extended or adjusted under 35 U.S.C. 154(b) by 18 days.

(21) Appl. No.: 13/728,958

(22) Filed: Dec. 27, 2012

(65) Prior Publication Data

US 2014/0184632 A1    Jul. 3, 2014

(51) Int. Cl.
| | |
|---|---|
| G06T 11/00 | (2006.01) |
| H04N 19/14 | (2014.01) |
| H04N 19/117 | (2014.01) |
| H04N 19/463 | (2014.01) |
| H04N 19/182 | (2014.01) |
| H04N 19/80 | (2014.01) |
| H04N 19/59 | (2014.01) |

(52) U.S. Cl.
CPC ........... *H04N 19/14* (2014.11); *H04N 19/117* (2014.11); *H04N 19/182* (2014.11); *H04N 19/463* (2014.11); *H04N 19/59* (2014.11); *H04N 19/80* (2014.11)

(58) Field of Classification Search
CPC .. G06F 17/30153; G06F 3/0638; G06F 19/22; G06F 2212/401; G06F 2212/6012; G06F 17/30554; G06F 17/30569; G06F 17/30451; G06F 17/30321; H04N 19/176; H04N 19/172; H04N 19/186; H04N 19/17; H04N 19/174; H04N 19/182; H04N 19/184; H04N 19/00769; H04N 19/0026; H04N 19/00272; H04N 19/00303; H04N 19/00533; H04N 19/00551; H04N 19/00696; H04N 7/183; H04N 19/52; H04N 19/463; H04N 19/134; H04N 19/48; H04N 19/85; G06T 1/60; G06T 1/20; G06T 2210/52; G06T 15/205; G06T 9/00; G06T 2200/28; G06T 15/503; H04L 67/1095; H04L 1/1861; H04L 2209/30; H04L 2463/061; G09G 2340/02; G09G 2360/122
See application file for complete search history.

(56) References Cited

U.S. PATENT DOCUMENTS

| | | |
|---|---|---|
| 5,103,490 A | 4/1992 | McMillin |
| 5,872,902 A | 2/1999 | Kuchkuda et al. |
| 6,518,974 B2 * | 2/2003 | Taylor ...................... G09G 5/02 345/582 |
| 7,200,263 B2 | 4/2007 | Curry et al. |
| 8,767,828 B2 | 7/2014 | Ma et al. |

(Continued)

*Primary Examiner* — Xilin Guo

(57) ABSTRACT

A method for performing index compression. The method includes identifying a tile in an image, wherein the image comprises a plurality of tiles, wherein each tile includes color associated with a plurality of pixels. Furthermore, the method includes generating a plurality of indices located throughout the tile, and storing the plurality of indices. Additionally, the method includes offsetting zero or more locations of an index of the plurality of indices from a pixel location.

20 Claims, 16 Drawing Sheets

(56) References Cited

U.S. PATENT DOCUMENTS

| | | |
|---|---|---|
| 2004/0049497 A1 | 3/2004 | Curry et al. |
| 2004/0105015 A1* | 6/2004 | Tsukioka ............... H04N 9/045 348/222.1 |
| 2006/0269134 A1 | 11/2006 | Wang et al. |
| 2008/0123945 A1* | 5/2008 | Andrew ............. G06K 9/00456 382/164 |
| 2008/0158246 A1 | 7/2008 | Ishii et al. |
| 2008/0187218 A1* | 8/2008 | Strom .................... G06T 9/001 382/166 |
| 2009/0154818 A1* | 6/2009 | Stefanov .................. G06T 9/00 382/239 |
| 2010/0329548 A1* | 12/2010 | Yoshimura ......... H04N 1/00278 382/164 |
| 2011/0242113 A1* | 10/2011 | Keall ................... G06F 9/3857 345/505 |
| 2012/0050563 A1* | 3/2012 | Cote ..................... H04N 5/235 348/223.1 |
| 2012/0213435 A1 | 8/2012 | Donovan et al. |
| 2013/0022265 A1 | 1/2013 | Werness et al. |
| 2014/0009576 A1* | 1/2014 | Hadzic et al. ................. 348/43 |
| 2014/0184632 A1 | 7/2014 | Donovan |
| 2014/0185952 A1 | 7/2014 | Cabral |

\* cited by examiner

| A | ● | B | b | C | c | D | ● |
| a | E | ● | F | ● | G | ● | H |
| I | ● | J | ● | K | ● | L | ● |
| i | M | m | N | ● | O | ● | P |

FIG. 14

METHOD AND SYSTEM FOR INDEX COMPRESSION FOR FIXED BLOCK SIZE TEXTURE FORMATS AND FOR NON-LINEAR INTERPOLATION OF INDEX VALUES ALONG AN EDGE IN A TILE

BACKGROUND

An image includes color information that is displayed on a two-dimensional array of pixels. The pixels are divided into tiles of the image. Color and/or texture information related to the pixels within a tile are stored in a block of memory. The image can be encoded (compressed) to reduce its size so that the image can be efficiently stored in memory. The stored information is then accessed, where it can be decoded (decompressed), reconstructed, and displayed.

An image's true color is typically rendered as 32 bits per pixel, wherein eight bits are assigned to each of the red, green, blue, and alpha (transparency) components. However, the cost of storing true color information for each of the pixels in an image is prohibitively high. In part, to keep the cost and required space reasonable, the memory included in image rendering systems is designed to store a finite amount of information that is smaller than the amount associated with the true information related to one or more images.

Additionally, the bandwidth required for rendering images is of concern. Transferring true color information (e.g., 32 bits for each pixel) for pixels in an image would require large amounts of bandwidth between the memory and the image renderer. For real-time images and videos, this bandwidth requirement is impossible to meet without increasing circuit layouts thereby increasing the size and cost of the image renderer.

One solution to the limited memory and bandwidth requirements is to compress and/or encode the true color information for an image, and to store the compressed data within memory. Thereafter, the compressed data is decoded (decompressed), reconstructed, and displayed. Proper implementation of compression and decompression methods is desired for lossless storage and display of images.

SUMMARY

In one embodiment, a system includes a tangible, non-transitory computer readable storage medium having stored thereon, computer-executable instructions that, when executed causes the computer system to perform a method for performing index compression. The method includes identifying a tile in an image, wherein the image comprises a plurality of tiles. Each of the tiles includes color information associated with a plurality of pixels. For instance, the color information includes a plurality of indices that along with base and delta values determine color data for each of the pixels in a corresponding tile. The method includes generating a plurality of indices throughout the tile, which are stored. The method also includes offsetting zero or more locations of an index of the plurality of indices from a pixel location.

In other embodiments, a system includes a tangible, non-transitory computer-readable storage medium having stored thereon, computer-executable instructions that, when executed causes the computer system to perform a method for performing image decompression. The method includes identifying a tile in an image comprising a plurality of tiles. Each of the tiles includes color data associated with a plurality of pixels. For instance, the color information includes a plurality of indices that along with base and delta values determine the color data for each of the pixels in the corresponding tile. The method also includes generating a plurality of indices located throughout the tile, which are stored. The method also includes identifying a pixel in the tile. Also, the method includes determining a group of indices associated with the pixel. In one embodiment, the group of indices is taken from one or more tiles. The method includes determining that the pixel lies on an edge, and more particularly, an edge defining color differences between the two sides of the edge. The method also includes determining an index value for the pixel by non-linearly filtering the group of indices, wherein the index provides a weighting value for determining a color value of the pixel. For instance, a color value of the pixel is determined based on base, delta, and index values.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

FIG. 6 is a diagram illustrating a pattern for storing index values, wherein the index values have varying bit sizes, in accordance with one embodiment of the present disclosure.

FIGS. 9A-B are diagrams illustrating the expansion of shapes from a tile to another tile, wherein the tiles are of different sizes, in accordance with embodiments of the present disclosure.

FIG. 14 is a diagram illustrating a pattern of stored index patterns implementing a 2 bit index value for every 2 pixels that is used for determining index values on or near a corresponding edge, in accordance with one embodiment of the present disclosure.

DETAILED DESCRIPTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "identifying," "determining," "generating," "offsetting," "storing," or the like, refer to actions and processes (e.g., flowcharts 700 and 1000 of FIGS. 7 and 10, respectively) of a computer system or similar electronic computing device or processor (e.g., system 100 of FIG. 1). The computer system or similar electronic computing device manipulates and transforms data represented as physical (electronic) quantities within the computer system memories, registers or other such information storage, transmission or display devices.

Figure 7:
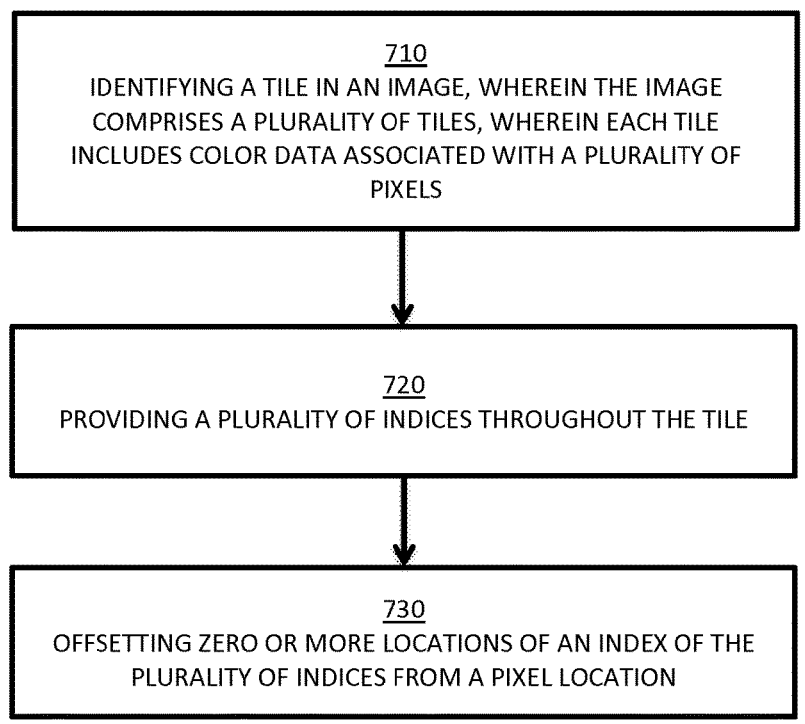
FIG. 7 is a flow diagram illustrating a method for index compression of a tile in an image, wherein at least one location of one or more index values is offset from one or more pixel locations in a tile, in accordance with one embodiment of the present disclosure.
Figure 10:
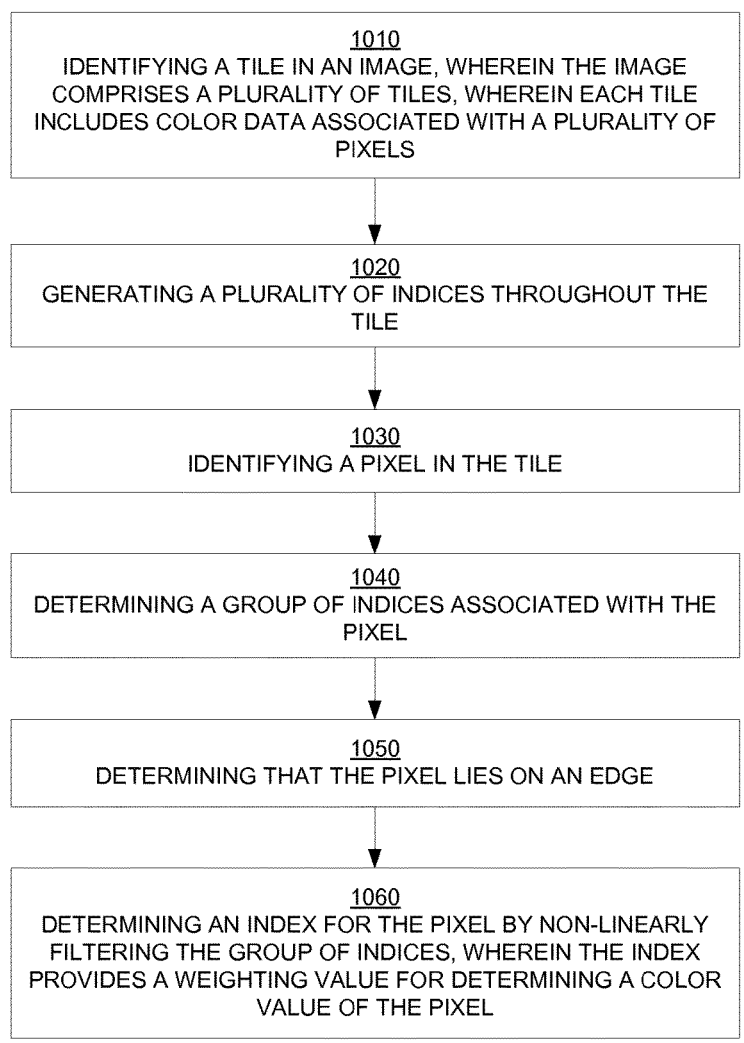
FIG. 10 is a flow diagram illustrating a method for edge detection in a tile in an image when determining index values on or near a corresponding edge, in accordance with one embodiment of the present disclosure.

FIGS. 7 and 10 are flowcharts of examples of computer-implemented methods for processing data according to embodiments of the present invention. Although specific steps are disclosed in the flowcharts, such steps are exemplary. That is, embodiments of the present invention are well-suited to performing various other steps or variations of the steps recited in the flowcharts.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can be accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

In the discussion that follows, unless otherwise noted, a "codec" refers to an element (e.g., a stand-alone or peripheral device, or an integrated system) that performs both encoding and decoding. For instance, "coding," unless otherwise noted, refers to basic encoding operations (e.g., interpolation, quantization, delta encoding, least significant bit compression, etc.), while "decoding" refers to basic decoding operations (e.g., reverse quantization, delta decoding, least significant bit decompression, etc.). One or more "tiles" refers to an array of pixels (e.g., N×N array), wherein each tile is associated with a "block" of memory that stores information used for rendering color and/or textures of a pixel in the corresponding tile. The term "pixel" refers to a location in two-dimensional screen space.

In embodiments of the present disclosure, systems and methods are described in which compression and decompression of base, delta, and index values are performed to store and display color and/or texture information for a pixel in an image. Advantages of embodiments of the present invention include the decompression of pixel information that is performed in a wrapped or clamped mode for pixels at the borders of an image. Other advantages of embodiments of the present invention include compression and decompression of pixel and tile information that are performed for images of arbitrary size, and not just powers of two sizes. Still other advantages of embodiments of the present invention provide for LSB compression and decompression of base and delta values for a tile of an image.

Figure 1:
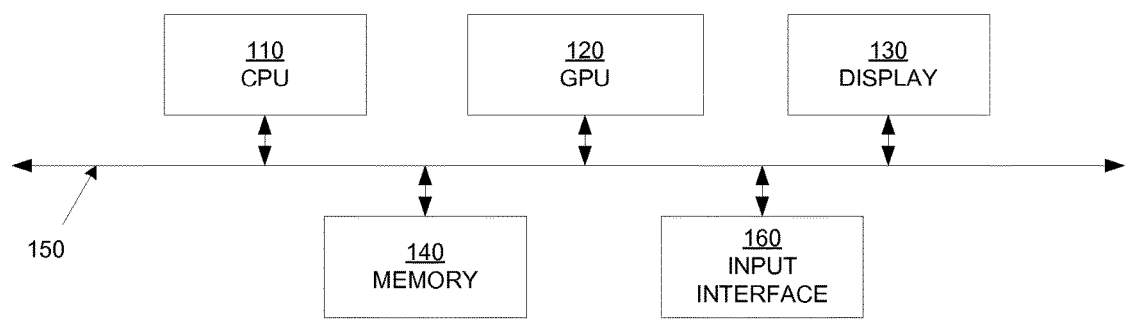
FIG. 1 depicts a block diagram of an exemplary computer system suitable for implementing the present methods in accordance with one embodiment of the present disclosure.

FIG. 1 is a block diagram of an example of a computing system 100 capable of implementing embodiments of the present disclosure. Computing system 100 broadly represents any single or multi-processor computing device or system capable of executing computer-readable instructions. Examples of computing system 100 include, without limitation, workstations, laptops, client-side terminals, servers, distributed computing systems, handheld devices, or any other computing system or device. In its most basic configuration, computing system 100 may include at least one processor 110 and a system memory 140.

Both the central processing unit (CPU) 110 and the graphics processing unit (GPU) 120 are coupled to memory 140. System memory 140 generally represents any type or form of volatile or non-volatile storage device or medium capable of storing data and/or other computer-readable instructions. Examples of system memory 140 include, without limitation, RAM, ROM, flash memory, or any other suitable memory device. In the example of FIG. 1, memory 140 is a shared memory, whereby the memory stores instructions and data for both the CPU 110 and the GPU 120. Alternatively, there may be separate memories dedicated to the CPU 110 and the GPU 120, respectively. The memory can include a frame buffer for storing pixel data that drives a display screen 130.

The system 100 includes a user interface 160 that, in one implementation, includes an on-screen cursor control device. The user interface may include a keyboard, a mouse, and/or a touch screen device (a touchpad).

CPU 110 and/or GPU 120 generally represent any type or form of processing unit capable of processing data or interpreting and executing instructions. In certain embodiments, processors 110 and/or 120 may receive instructions from a software application or hardware module. These instructions may cause processors 110 and/or 120 to perform the functions of one or more of the example embodiments described and/or illustrated herein. For example, processors 110 and/or 120 may perform and/or be a means for performing, either alone or in combination with other elements, one or more of the identifying, determining, quantizing, reverse quantization, delta encoding, and delta decoding, described herein. Processors 110 and/or 120 may also perform and/or be a means for performing any other steps, methods, or processes described and/or illustrated herein.

The computer-readable medium containing the computer program may be loaded into computing system 100. All or a portion of the computer program stored on the computer-readable medium may then be stored in system memory 140 and/or various portions of storage devices. When executed by processors 110 and/or 120, a computer program loaded into computing system 100 may cause processor 110 and/or 120 to perform and/or be a means for performing the functions of the example embodiments described and/or illustrated herein. Additionally or alternatively, the example embodiments described and/or illustrated herein may be implemented in firmware and/or hardware.

Figure 2:
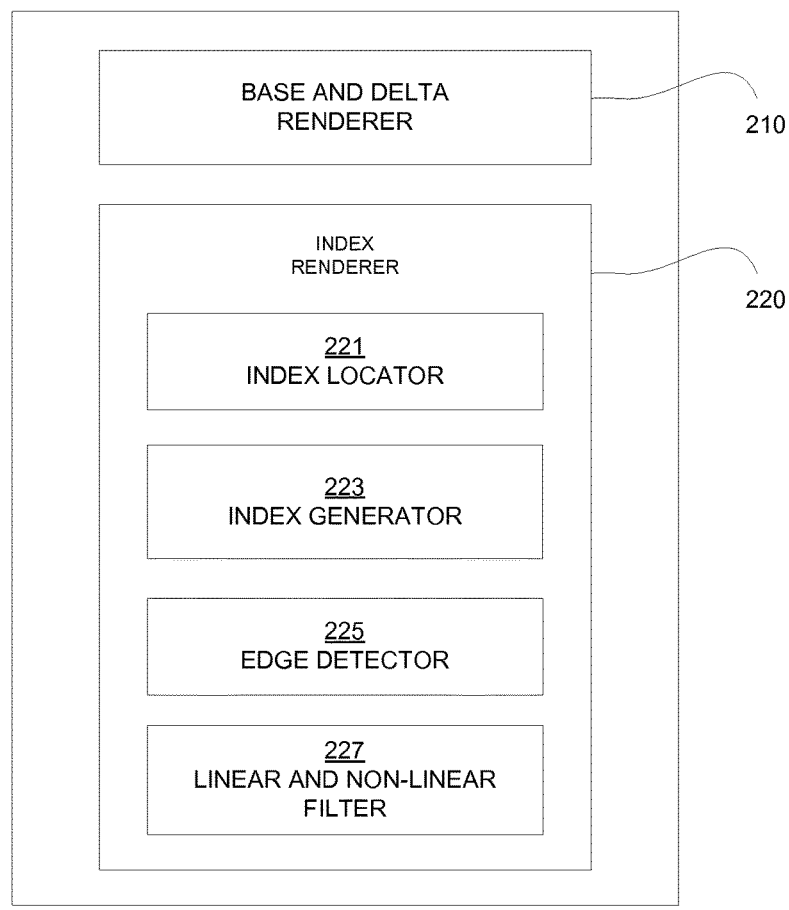
FIG. 2 is a block diagram of an image coder/decoder (codec) configured to render images, in accordance with one embodiment of the present disclosure.

FIG. 2 is a block diagram of a coder/decoder (codec) 200 that is configured to render images, in accordance with one embodiment of the present disclosure. More specifically, the coder within codec 200 is configured to compress color and/or texture information for pixels of an image for storage. The decoder is configured to receive the compressed color and/or texture information, decode the information, and produce a displayable image.

In one embodiment, codec 200 includes a base and delta renderer 210 and an index renderer 220, which combined are configured to render images. The base and delta renderer 210 and the index renderer 220 are configurable for compressing color and/or texture information associated with pixels of one or more tiles of an image, and is also configurable for decompressing the compressed color and/or texture information for pixels of tiles of an image for purposes of displaying the image. For instance, the base and delta renderer 210 is configured to interpolate and/or determine base and delta values for a tile of an image. Also, the index renderer 220 is configured to interpolate and/or determine one or more indices for a tile of an image. As such, for each pixel in a tile, a color value is determined based on the base and delta values that is weighted by an index value corresponding to the pixel.

More particularly, the index renderer 220 includes an index locator 221 and index generator 223. The index locator 221 and index generator 223 act in combination to generate index values located throughout a corresponding tile. For instance, based on given index values for a plurality of pixels of a tile, for purposes of compressing the index information, various locations throughout the tile are selected for storing corresponding index values. The index locator 221 determines the locations of the stored index locations in the tile, and the index generator 223 determines index values for the selected locations. These stored index values are used to determine index values for pixels in the tile through various filtering techniques, such as, bilinear filtering, non-linear filtering etc., used by the linear and non-linear filter 227.

The index renderer 220 also includes an edge detector 225 and a linear/nonlinear filter 227 that in combination are used to decompress index values when an edge is detected for a pixel in a tile of an image. Embodiments of the present invention are implemented in a tile patterned with index values stored for every two pixels, such as, in a checkerboard pattern. Specifically, edge detector 225 is configured to determine when a pixel is located on an edge. For instance, horizontal and vertical edges are determined using various techniques, such as, gradient matching. Additionally, the nonlinear filter 227 is able to determine an index value by applying a first non-linear filter when it is a horizontal edge detected, and a second non-linear filter when a vertical edge is detected.

Embodiments of the present invention provide for one or more fixed-block size texture compression formats. For instance, 1, 2, and 4 bits/pixel (bpp) formats are supported for compressing red, green, and blue (RGB) and red, green, blue, and alpha (RGBA) images of uncompressed 8 bits per channel. At a high level, an image is decompressed by up-sampling base and delta image information. For purposes of the present application, a texel provides color and texture information for a representative pixel on a display. Also, a texture is defined by its dimensions, a set of format selectors, and blocks defining the texels based on the format selected. A compressed texture may be of any size. That is, textures are not limited to dimensions that are a power of two, in one embodiment. In another embodiment, textures are not limited to an integer multiple of the block size.

Figure 3A:
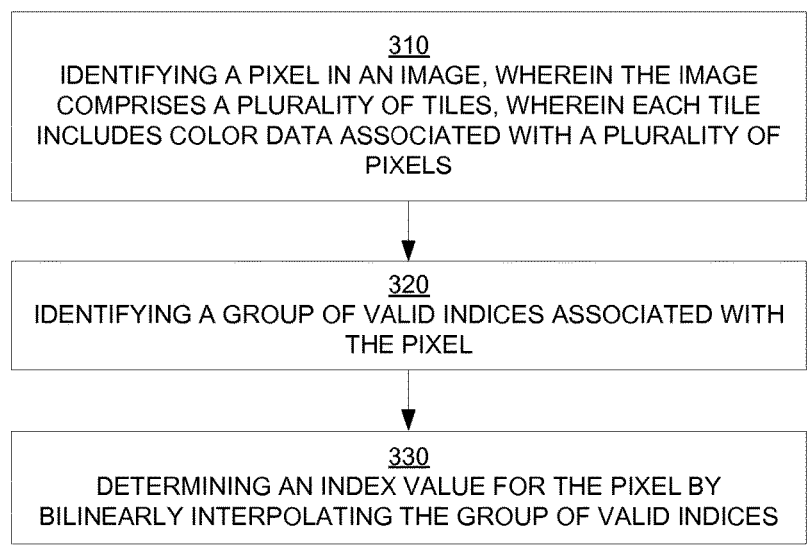
FIG. 3A is a flow diagram illustrating a method for determining an index value for a pixel in a tile, in accordance with one embodiment of the present disclosure.

FIG. 3A is a flow diagram 300A illustrating a method for decompression, and more particularly for determining an index value for a pixel of a tile, in accordance with one embodiment of the present disclosure. In another embodiment, flow diagram 300A illustrates a computer implemented method for determining an index value of a pixel in an image, in accordance with one embodiment of the present disclosure. In still another embodiment, flow diagram 300A is implemented within a computer system including a processor and memory coupled to the processor and having stored therein instructions that, if executed by the computer system causes the system to execute a method for determining an index value of a pixel of a tile in an image. In another embodiment, instructions for performing a method as outlined in flow diagram 300A are stored on a non-transitory computer-readable storage medium having computer-executable instructions for causing a computer system to perform a method for determining an index value of a pixel of a tile in an image. The method outlined in flow diagram 300A is implementable by one or more components of the computer system 100 of FIG. 1, and the codec 200 of FIG. 2, in various embodiments.

At 310, the method includes identifying a pixel in an image, wherein the image comprises a plurality of tiles. Each tile includes color data associated with a plurality of pixels. At 320, the method includes identifying a group of valid indices associated with the pixel. The valid indices include stored index values or weights located throughout the tile, such as, at corresponding pixel locations, or offset from pixel locations. In one embodiment, the group of valid indices includes indices from one or more tiles.

At 330, the method includes determining an index value for the pixel by interpolating the group of valid indices. Index values for pixel locations are determined by applying a filter function to the neighbor valid indices. For instance, a linear filter function, a bilinear filter function, or a non-linear filter function may be applied to determine an index value for a pixel. In one embodiment, the index value is determined by bilinearly interpolating the group of valid indices.

Figure 3B:
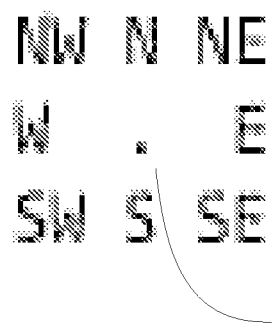
FIG. 3B is a diagram illustrating the eight nearest neighbors of pixels to a particular pixel for purposes of determining an index value for the pixel, in accordance with one embodiment of the invention.

For instance, FIG. 3B is a diagram 300B illustrating a pixel 350 and neighboring pixels having one or more valid index values for purposes of determining an index value for pixel 350, in accordance with one embodiment of the present disclosure. To determine the index value for pixel 350, one or more valid indices are determined for a group of pixels, such as, the neighboring pixels shown in diagram 300B. In one embodiment, neighboring pixels include the N, S, E, and W pixels for determining the valid indices. In another embodiment, neighboring pixels include N, NE, E, SE, S, SW, W, and NW pixels for determining valid indices. A larger grouping may include pixels outside of the neighboring pixels shown in diagram 300B. The valid indices include index values or weights that are stored for the neighboring pixels. The valid indices are then interpolated (e.g., linear, bilinear, and non-linear interpolation techniques) to determine the index value for pixel 310. In one embodiment, bilinear interpolation is performed on the group of valid indices to determine the index value of the pixel 350. In another embodiment, the valid indices are averaged, and then rounded to determine the index value for pixel 310.

Figure 4:
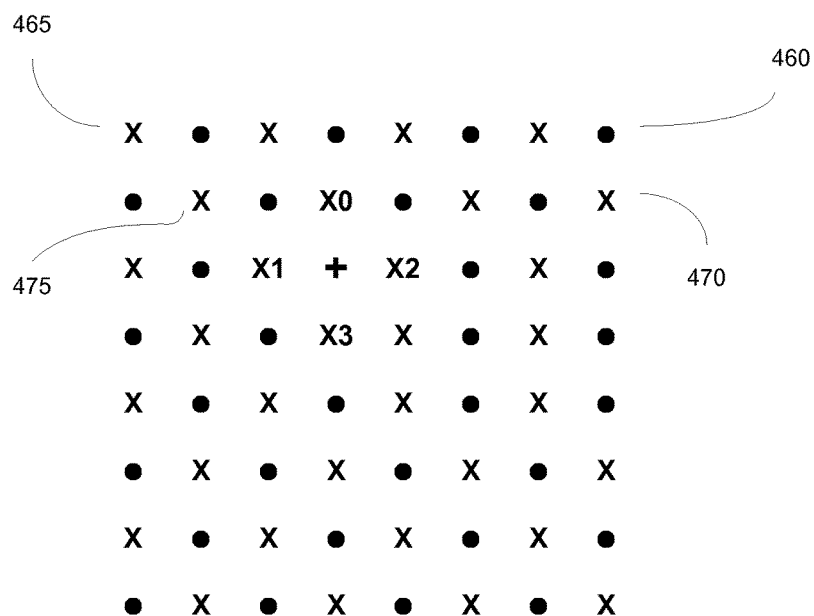
FIG. 4 is a diagram illustrating a stored index pattern including a 2 bit index value stored for every 2 pixels for providing index values for pixels in a tile, in accordance with one embodiment of the present disclosure.

As an example, FIG. 4 is a diagram illustrating a stored index pattern including a 1 bit index value stored for every 2 pixels for providing index values for pixels in a tile, in accordance with one embodiment of the present disclosure. For instance, tile 400 shows the pixels used for determining an index value for pixel (+). The index values are interpolated from neighboring Xs, wherein indices or weights of indices are stored corresponding to the Xs in the tile 400. For example, the index value at "+" would be computed by interpolating X0, X1, X2, and X3 located to the north, south, east and west of pixel (+). In one embodiment, the index value is computed by taking the rounded mean value.

FIGS. 5A-D provide illustrations of various stored index or weighted index patterns implementing a 2 bit index value stored for every 4 pixels (a 2/4 format) in an 8×8 pixilated tile, in accordance with embodiments of the present disclosure. In one embodiment, index values are stored as weights in a corresponding tile. For instance, a 1 bit index value give {0,16}/16 weights, and a 2 bit index value give {0,5,11,16}/16 weights. Index interpolation is performed as described above (e.g., bilinear interpolation, non-linear interpolation, rounded average, etc.).

Various patterns for a 2/4 format for storing index and/or weighted index values are shown in FIGS. 5A-D. Other patterns are supported in other embodiments of the invention. In each pattern 500A-D, there is stored a 2 bit index value for every 4 pixels.

Figure 5A:
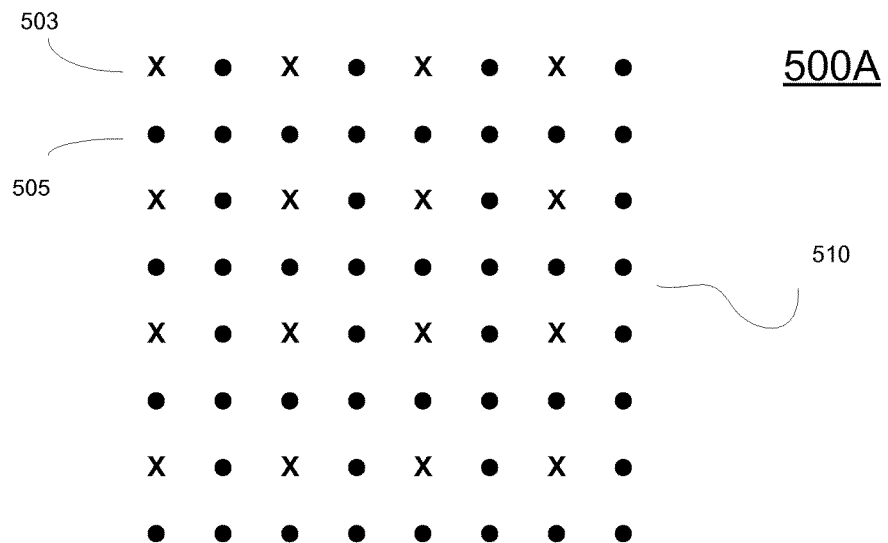
FIGS. 5A-D provide illustrations of various stored index patterns implementing a 2 bit index value stored for every 4 pixels, in accordance with embodiments of the present disclosure.

For instance, in FIG. 5A, the index values are located at corresponding pixel locations, and are symmetrically located throughout tile pattern 500A. The pattern 500A is repeatable throughout the tile 510, such as, storing an index value every other pixel in a first row 503 beginning with the far left pixel, and then not storing any index values for pixels in a second row 505 adjacent to the first row 503. These two rows are repeated throughout the tile 510.

Figure 5B:
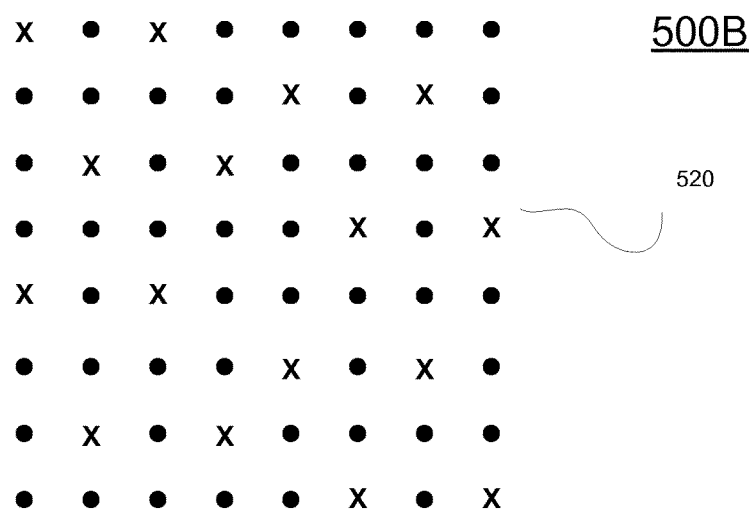
Figure 5C:
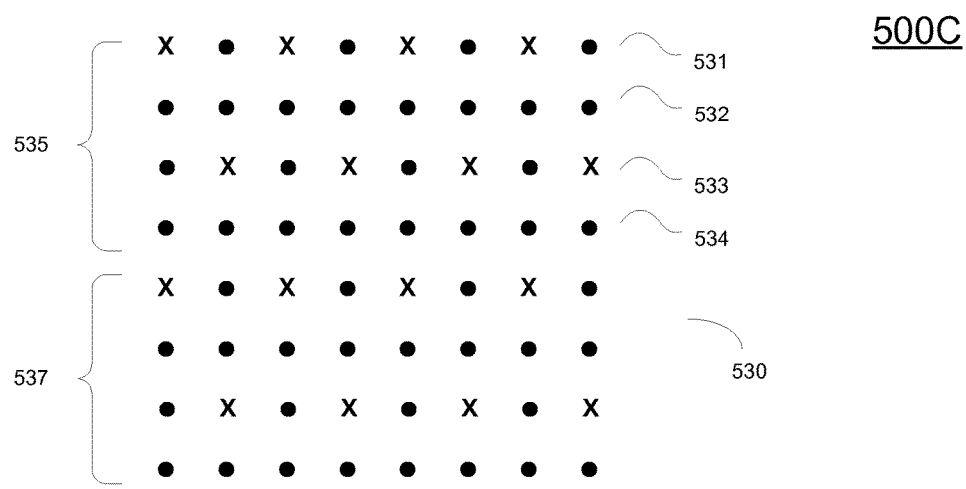
Figure 5D:
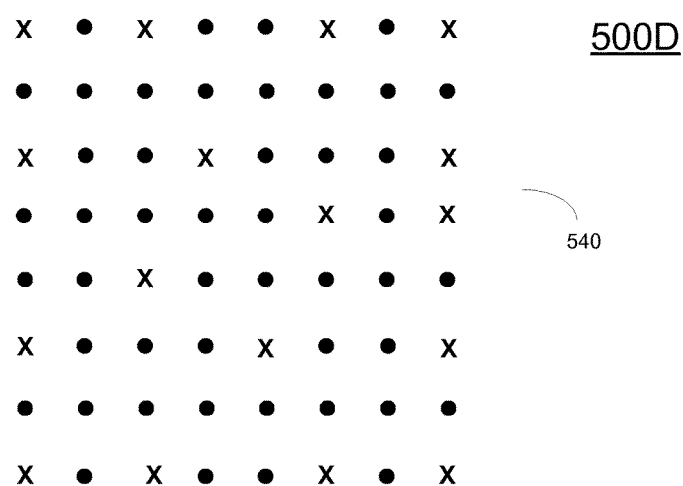

Further, in FIG. 5C, index values are located at corresponding pixel locations in tile 530, wherein the top half 535 is identical the bottom half 537. In particular, as described in the top half 535, row 531 illustrates the storing of pixel values every other pixel beginning with the far left pixel, and row 533 illustrates the storing of pixel values every other pixel beginning with the second most far left pixel. Rows 532 and 534 do not store any pixel values. This pattern is repeatable in the bottom half 537.

Also, in the pattern 500B of FIG. 5B, index values are asymmetrically located at corresponding pixel locations in tile 520. Also, in FIG. 5D, in pattern 500D, index values are asymmetrically located at corresponding pixel locations in tile 540.

Figure 6:
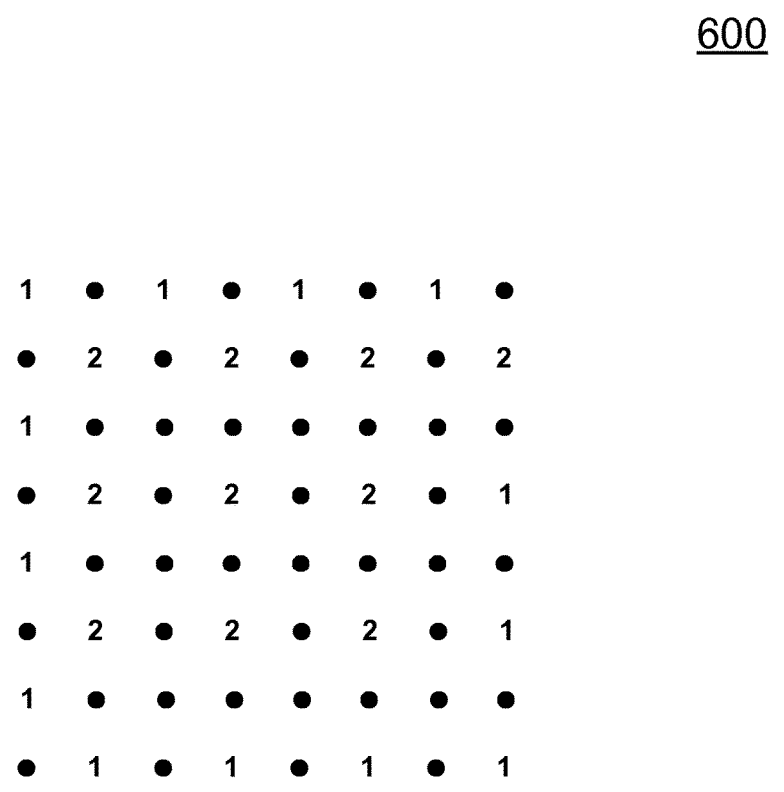

FIG. 6 is a diagram illustrating a pattern 600 for storing index values, wherein the index values have varying bit sizes, in accordance with one embodiment of the present disclosure. As such, more samples can be stored for purposes of storing index values or weights of index values. A "1" represents a 1 bit index value stored at the corresponding pixel location. A "2" represents a 2 bit index value stored at the corresponding pixel location. Patterns for storing index values having varying index bits may be asymmetric or symmetric, in embodiments.

FIG. 7 is a flow diagram 700 illustrating a method for index compression of a tile in an image, wherein at least one location of one or more index values is offset from one or more pixel locations in a tile, in accordance with one embodiment of the present disclosure. In another embodiment, flow diagram 700 illustrates a computer implemented method for index compression of a tile in an image, in accordance with one embodiment of the present disclosure. In still another embodiment, flow diagram 700 is implemented within a computer system including a processor and memory coupled to the processor and having stored therein instructions that, if executed by the computer system causes the system to execute a method for index compression of a tile in an image. In another embodiment, instructions for performing a method as outlined in flow diagram 700 are stored on a non-transitory computer-readable storage medium having computer-executable instructions for causing a computer system to perform a method for index compression of a tile in an image. The method outlined in flow diagram 700 is implementable by one or more components of the computer system 100 of FIG. 1, and the codec 200 of FIG. 2, in various embodiments.

Fundamentally, when performing index compression, a subset of available locations are assigned for storing index values or weights of index values in a tile. Index values at remaining positions are estimated by applying a function (e.g., linear, bilinear, non-linear, average weighting, etc.) to the neighboring valid indices. In one embodiment, the sampled values are located at various positions in a corresponding tile. These sample values can be fitted to a surface representing index values throughout the tile. The surface is then sampled to determine index values at missing pixel positions. In one embodiment, one or more of the available positions where index values are stored match some of the pixel locations. In another embodiment, one or more of the available positions where index values are stored do not match pixel locations, and are offset from one or more corresponding pixel locations, as is further described in relation to flow diagram 700.

At 710, the method includes identifying a tile in an image, wherein the image comprises a plurality of tiles, each of which provides color and/or texture data that is displayable by a plurality of pixels for the image. For instance, color data includes base, delta, and one or more indices for a corresponding tile. The indices provide weighting information for pixels in the tile. The color data is compressed for storing, and decompressed to determine color data for each pixel in the tile. In particular, for any given pixel in the tile, information related to color and/or texture is determined based on the compressed base, delta, and index information for the tile associated with the pixel.

At 720, the method includes providing a plurality of indices throughout the tile when performing index compression. That is, instead of storing indices for all the pixels in a tile, a subset of indices is stored for associated pixels that number less than the total number of pixels in the tile. For instance, in an 8×8 pixilated tile including 64 pixels, one pattern may include 32 valid indices for the tile, another pattern may include 16 valid indices for the tile, etc.

In one embodiment, when performing index compression, a subset of available locations is assigned for storing index values or weights of index values in a tile. Index values at remaining positions are estimated by applying a function (e.g., linear, bilinear, non-linear, average weighting, etc.) to the neighboring valid indices. In one embodiment, the sampled values are located at various positions in a corresponding tile. These sample values can be fitted to a surface representing index values throughout the tile. The surface is then sampled to determine index values at missing pixel positions.

At 730, the method includes offsetting zero or more locations of an index of the plurality of indices from a corresponding pixel and/or pixel location. For instance, instead of associating a valid index value at a location of a pixel location, the location of the index stored is offset from one or more pixel locations. Moreover, the pixel value at that offset location is determined based on the index values of neighboring indices. That is, starting from known indices at all the pixel locations, index values for any location that is offset from a pixel location may be determined based on index values of neighboring indices.

Figure 8:
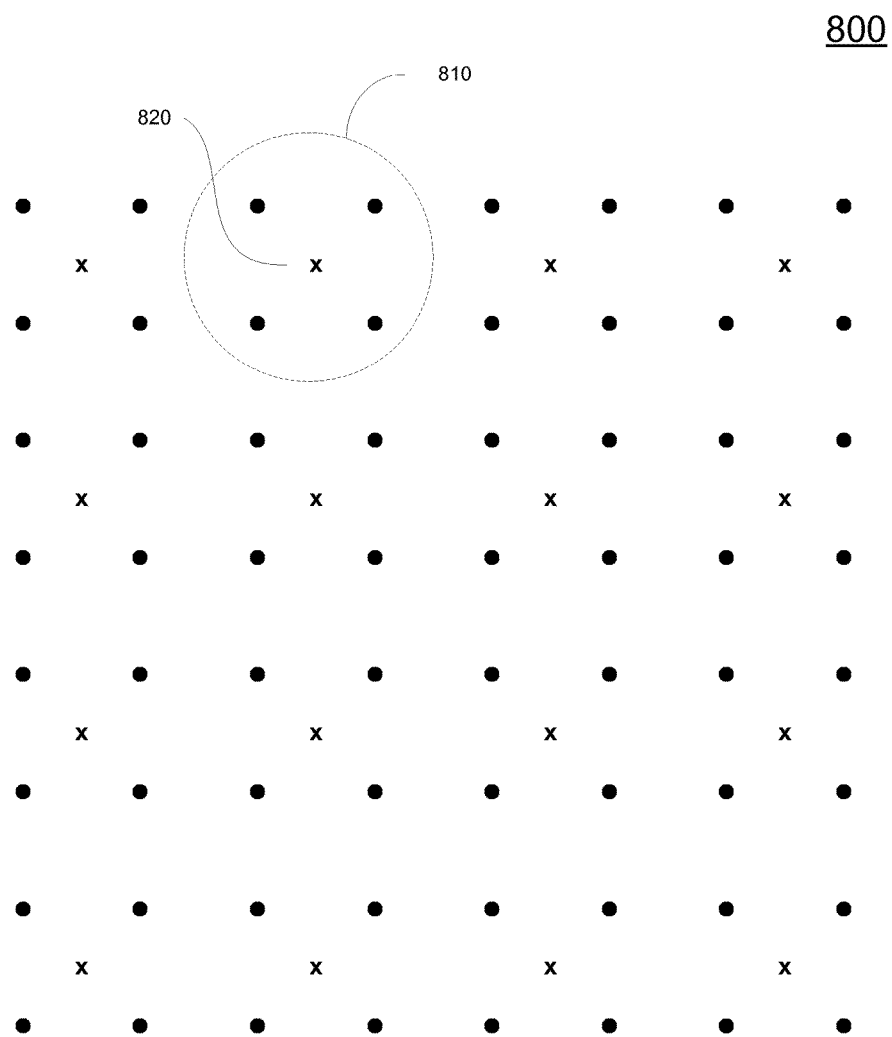
FIG. 8 is a diagram illustrating a pattern of stored index patterns implementing a 2 bit index value stored for every 4 pixels, wherein locations of index values are offset from pixel locations in a tile, in accordance with one embodiment of the present disclosure.

In one embodiment, valid index values for the tile are all offset from pixel locations. For instance, FIG. 8 is a diagram illustrating a pattern of stored index patterns implementing a 2 bit index value stored for every 4 pixels, wherein locations of index values are offset from pixel locations in a tile 800, in accordance with one embodiment of the present disclosure. The "xs" are symmetrically located throughout tile 800.

For illustration, a portion 810 of tile 800 includes four pixels and their corresponding locations as indicated by a dot. Also, a valid index value 820 is shown at location "x" in portion 820. The valid index value 820 is offset from the pixel locations in portion 810, as well as from all pixel locations in tile 800. As previously described, the valid index value 820 is determined from neighboring pixel locations with index values. In one embodiment, the valid index value 820 is determined by performing a bilinear filtering application using the nearest pixel locations (e.g., 2, 3, 4, etc.) and considering distances to the nearest pixel locations.

In another embodiment, at least one valid index value for a tile is offset from one or more pixel locations, and at least one valid index value for the tile is located at a pixel location. As such, valid index values are located at pixel locations and offset from pixel locations. In still another embodiment all the valid index values are located at corresponding pixel locations.

In one embodiment, the plurality of indices is balanced throughout the tile. That is, the indices are symmetrically located throughout the tile in a repeatable pattern. In another embodiment, the plurality of indices is unbalanced throughout the tile. That is, the indices are asymmetrically located throughout the tile.

In some index compression formats, index to weight mapping includes using the index directly as a scaled weight. For example, in DXT1, the weight is defined as (0, 1, 2, 3)/3. Also, the number of bits to do the weight interpolation is determined in various ways. If the hardware implements a 2 bit interpolation (e.g., weights are (0, 1, 2, 3)/3 only), then the index interpolation should round the interpolated value to 2 bits also. Alternatively, if the hardware implements an interpolation via table_dxt[index]/64, then the table could be extended to include more entries and interpolate the indices to more bits. For instance, 2 bit indices could interpolate to a 4 bit value, which is then looked up in a larger table to get the actual weight used for color interpolation.

Figures 9A, 9B:
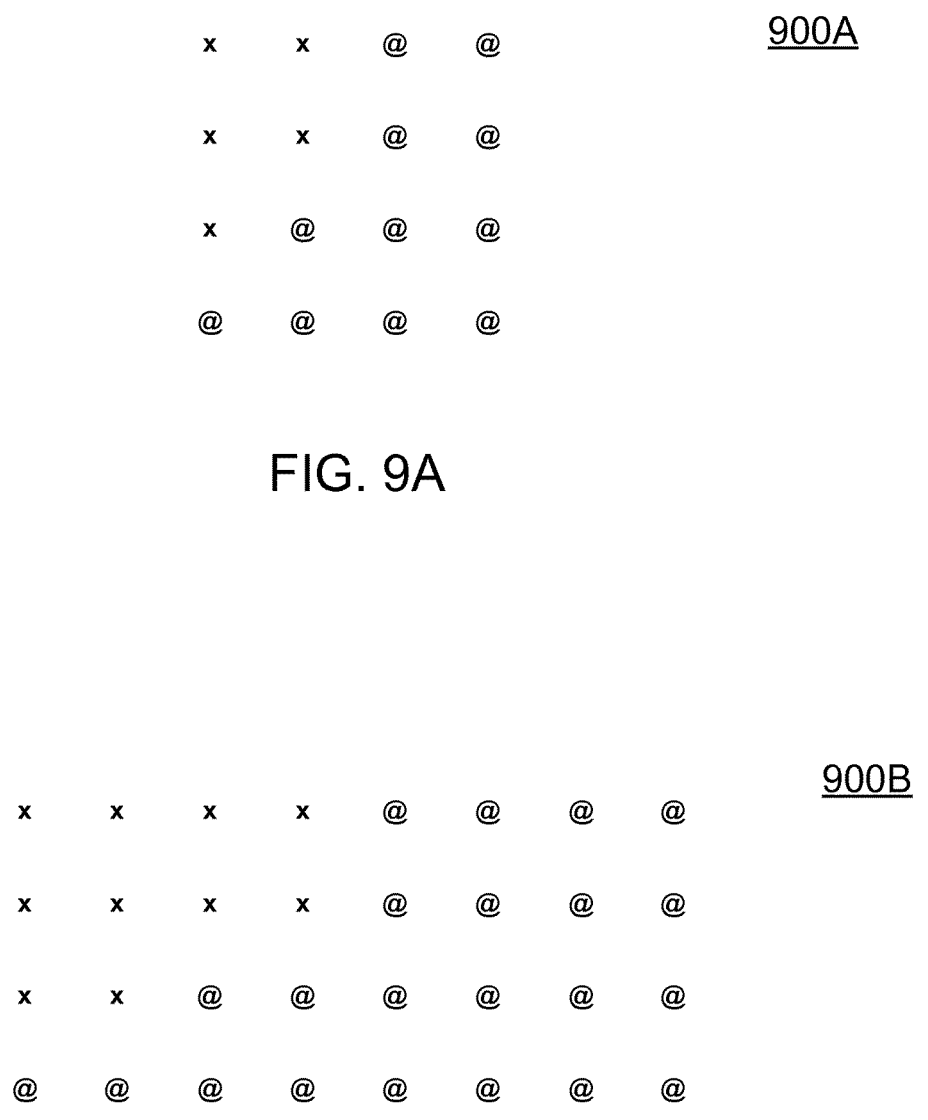

In one embodiment, not only are indices associated with the pixels of a tile, but a shape is also associated with the tile, such as, as in BC6/BC7 textures. In one embodiment, the shape is expanded as the tile is expanded. For instance, FIGS. 9A-B are diagrams illustrating the expansion of shapes from a tile to another tile, wherein the tiles are of different sizes, in accordance with embodiments of the present disclosure. FIG. 9A illustrates a tile 900A that includes 4×4 pixels, and a shape indicated by "@" at various pixel locations. FIG. 9B shows the switch of tile 900A of a 4×4 pixilated format to tile 900B of a larger format. Specifically, the tile 900B includes a 2 bit per pixel (2bpp) format with a 4×8 pixilated tile size. As shown, the shape as indicated by "@" at various pixel locations is also expanded in the horizontal and vertical directions, but maintains is general outline.

FIG. 10 is a flow diagram 1000 illustrating a method for edge detection in a tile in an image when determining index values on or near a corresponding edge for purposes of determining a color value for a pixel in an image, in accordance with one embodiment of the present disclosure. Specifically, a non-linear interpolation is defined when the goal is to preserve horizontal and vertical edges as outlined in flow diagram 1000, in embodiments of the present invention. In another embodiment, flow diagram 1000 illustrates a computer implemented method for determining index values on or near a corresponding edge of a tile in an image, in accordance with one embodiment of the present disclosure. In still another embodiment, flow diagram 1000 is implemented within a computer system including a processor and memory coupled to the processor and having stored therein instructions that, if executed by the computer system causes the system to execute a method for determining index values on or near a corresponding edge of a tile in an image. In another embodiment, instructions for performing a method as outlined in flow diagram 1000 are stored on a non-transitory computer-readable storage medium having computer-executable instructions for causing a computer system to perform a method for determining index values on or near a corresponding edge of a tile in an image. The method outlined in flow diagram 1000 is implementable by one or more components of the computer system 100 of FIG. 1, and the codec 200 of FIG. 2, in various embodiments.

At 1010, the method includes identifying a tile in an image, wherein the image comprises a plurality of tiles, each of which provides color and/or texture data that is displayable by a plurality of pixels for the image. For instance, color data includes base, delta, and one or more indices for a corresponding tile. The indices provide weighting information for pixels in the tile. The color data is compressed for storing, and decompressed to determine color data for each pixel in the tile. In particular, for any given pixel in the tile, information related to color and/or texture is determined based on the compressed base, delta, and index information for the tile associated with the pixel.

At 1020, the method includes generating a plurality of indices throughout the tile when performing index compression. That is, instead of storing indices for all the pixels in a tile, a subset of indices is stored for associated pixels that number less than the total number of pixels in the tile is generated and stored.

In one embodiment, the plurality of indices is symmetrically located throughout the tile in a repeatable grid pattern. For instance, the pattern 400 of FIG. 4 illustrates a plurality of stored indices for the tile, wherein the grid pattern 400 comprises a first row 460 that includes indices stored every other pixel, beginning with the first pixel 465 farthest to the left. The grid pattern comprises a second row 470 adjacent to the first row, and includes indices stored every other pixel, beginning with the second pixel 475 from the left. That is, the indices of the second pixel are offset by one pixel from indices in the first row 460. More specifically, the pattern 400 illustrates a checkerboard pattern of stored indices.

At 1030, the method includes identifying a pixel in the tile. The pixel is associated with color and/or texture information for purposes of displaying a corresponding image. The color and/or texture information is determined in part on the decompressed index value associated with the pixel.

Figure 11:
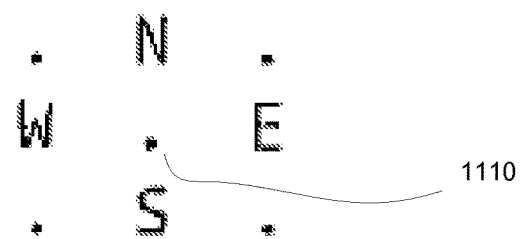
FIG. 11 is a diagram illustrating the four nearest neighbors of pixels associated with valid index values to a particular pixel for purposes of determining an index value for the pixel, in accordance with one embodiment of the invention.

At 1040, a group of valid indices is determined, wherein the group of valid indices is associated with the pixel. The valid indices include stored index values or weights located throughout the tile, such as, at corresponding pixel locations, or offset from pixel locations. In one embodiment, the group of valid indices includes indices from one or more tiles. In one embodiment, the group of valid indices is taken from the nearest or adjacent neighbors of the pixel, as previously discussed. For instance, in one embodiment, consistent with the checkerboard pattern of stored indices shown in FIG. 4, the group of valid indices are taken from the N, S, W, and E neighbors of pixels. As an example, FIG. 11 is a diagram 1100 illustrating the four nearest neighbors of pixels associated with valid index values to a particular pixel for purposes of determining an index value for the pixel.

At 1050, the method includes determining that the pixel lies on an edge. In one embodiment, the edge is determined when three of the four valid indices selected are substantially different from a fourth index in the group of indices. For instance, the difference may be determined by performing gradient estimation. Examples of edges are illustrated in FIGS. 12A-B.

Figure 12A:
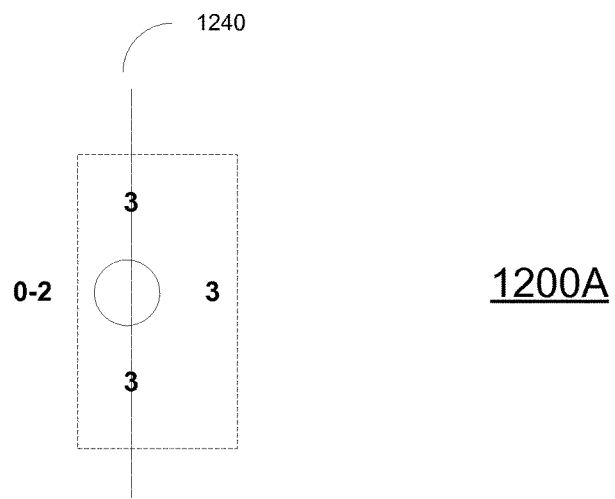
FIG. 12A-B are diagrams illustrating the implementation of gradient matching when detecting horizontal and vertical edges, in accordance with embodiments of the present disclosure.

As an example, FIG. 12A is a diagram 1200A illustrating a vertical edge 1240, wherein the four valid indices include a grouping of N, E, and S indices all having an index value of 3, and a separate grouping of a fourth index having values between 0-2. The two groupings show indices in the two groups that are substantially different and indicate a vertical edge 1240.

Figure 12B:
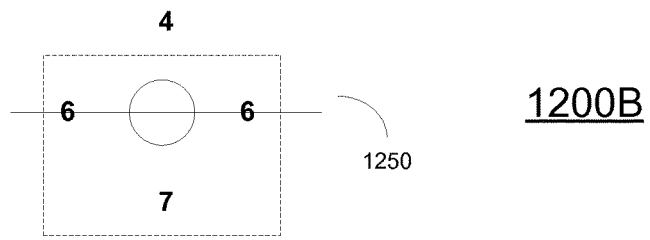

As another example, FIG. 12B is a diagram 1200B illustrating a horizontal edge 1250, wherein the four valid indices include a grouping of W, E, and S indices all having similar indices between values of 6 and 7, and a separate grouping of a fourth index having an index value of 4. The two groupings show that the indices in the two groups are substantially different and indicate a horizontal edge 1250.

Returning back to FIG. 10, at 1060, an index value for the pixel is determined by non-linearly filtering the group of indices. The non-linear technique is chosen based on whether an edge is detected, and whether the edge is a vertical or horizontal edge. The index value provides a weighting value for determining a color value of a corresponding pixel.

Figure 13A:
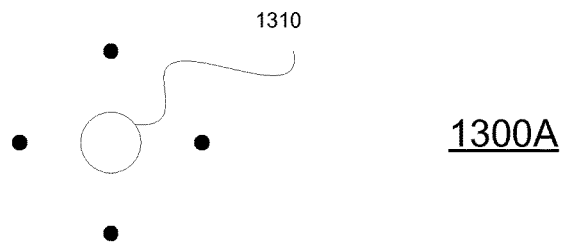
FIGS. 13A-C are diagrams illustrating three different techniques for determining index values for a pixel in cases where no edge, a vertical edge, and a horizontal edge are detected, in accordance with embodiments of the present disclosure.

In one embodiment, when no edge is detected at 1050, then linear interpolation of the valid indices is performed to determine the index value of the corresponding pixel. For instance, FIG. 13A is a diagram 1300A that shows four valid indices at N, S, E, and W pixel locations that are used to determine the index value of the pixel 1310.

Figure 13B:
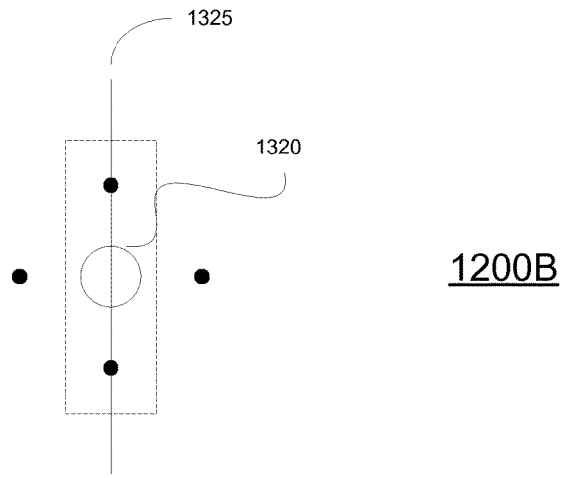

In one embodiment, when a vertical edge is detected at 1050, a non-linear interpolation of the valid indices is performed to determine the index value of the corresponding pixel. For instance, FIG. 13B is a diagram 1300B that shows pixel 1320 located on a vertical edge 1325. In this case, the vertical edge is detected when three indices, comprising the north and south indices and the west or east index, are substantially different from the fourth index (either the west or east index). The index value of the pixel 1320 is determined by averaging the north and the south index, in one embodiment.

Figure 13C:
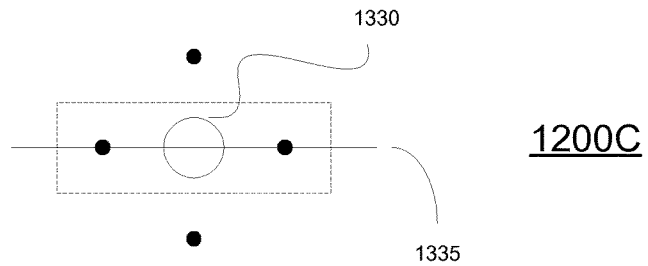

In one embodiment, when a horizontal edge is detected at 1050, a non-linear interpolation of the valid indices is performed to determine the index value of the corresponding pixel. For instance, FIG. 13C is a diagram 1300C that shows pixel 1330 located on a horizontal edge 1335. In this case, the horizontal edge is detected when three indices, comprising the west and east indices and the north or south index, are substantially different from the fourth index (either the north or south index). The index value of the pixel 1330 is determined by averaging the west and the east index, in one embodiment.

Figure 14:
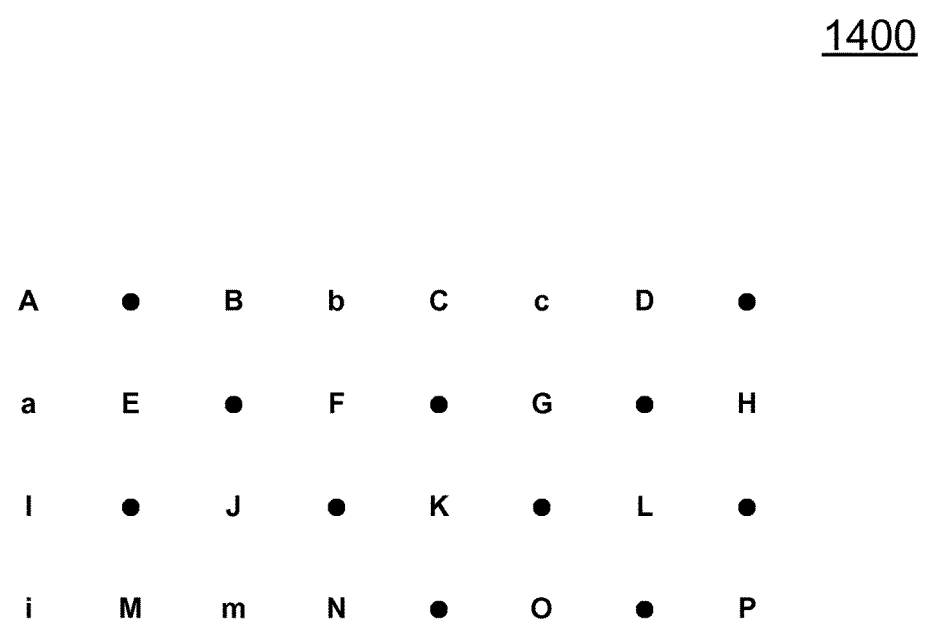

More specifically, in another embodiment, edge detection and non-linear filtering to determine an index value is illustrated in FIG. 14 that illustrates a pattern 1400 of index values in a 2 bit index value for every 2 pixels (2/2 format), in accordance with one embodiment of the present disclosure. If vertical edges are preserved, then "a" is set equal to "A" (and to "I"), only if "A"="I". That is, if "A" and "I" are determined to be on an edge, then that edge is propagated to "a" and "i". Similarly, "b" is set equal to "B" (and to "C"), only if "B"="C", and similarly for "c".

If there is a conflict, such as, when "M" and "N" are equal and the edge is extended to "i", but "A" and "I" are also equal, and not equal to "M", then one direction is chosen arbitrarily. For instance, the horizontal edge is prioritized over the vertical edge, or vice versa.

Thus, according to embodiments of the present disclosure, systems and methods are described in which compression and decompression of index values are performed to store and display color and/or texture information for a pixel in an image. Embodiments of the present invention include compression and decompression of pixel and tile information that are performed for images of arbitrary size, and not just powers of two sizes.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the present disclosure are thus described. While the present disclosure has been described in particular embodiments, it should be appreciated that the disclosure should not be construed as limited by such embodiments, but rather construed according to the below claims.

The invention claimed is:

1. A non-transitory computer-readable medium having computer-executable instructions for performing a method of image compression and decompression, the method comprising:

accessing a first plurality of indices associated with a tile of an image, wherein each index of said first plurality of indices corresponds to a respective location in said tile, wherein a total number of said first plurality of indices is smaller than a total number of pixels in said tile, and wherein further said first plurality of indices result from an index compression process on said plurality of pixels and are stored in a storage device; and decompressing said first plurality of indices to determine color data of each pixel of said plurality of pixels, wherein said decompressing comprises:

determining a location of said pixel in said tile;

identifying a group of indices resulted from said index compression based on said location of said pixel and further based on locations of said group of indices, wherein each index in said group of indices corresponds to a different location;

performing interpolation on said group of indices to determine an interpolated index for said pixel;

using said interpolated index of said pixel as an index to search a weight lookup table to determine a weight, wherein said weight correspond to an interpolated weight that is determined based on weights stored for said group of indices, wherein said group of indices correspond to locations neighboring said pixel; and using said weight to determine a color data of said pixel.

2. The non-transitory computer-readable medium of claim 1, wherein said performing interpolation comprises performing bilinear interpolation on said group of indices.

3. The non-transitory computer-readable medium of claim 1, wherein said group of indices correspond to locations neighboring said pixel.

4. The non-transitory computer-readable medium of claim 1, wherein the method further comprises performing said index compression process for said plurality of pixels, wherein said index compression process comprises assigning a set of locations in said tile, wherein said first plurality of indices correspond to said set of locations.

5. The non-transitory computer-readable medium of claim 4, wherein said set of locations coincide with pixel locations of said tile.

6. The non-transitory computer-readable medium of claim 4, wherein said set of locations are partially or entirely offset from pixel locations of said tile.

7. The non-transitory computer-readable medium of claim 6, wherein said index compression process further comprises determining said first plurality of indices based on pixels neighboring said set of locations.

8. The non-transitory computer-readable medium of claim 1, wherein said determining said color data is further based on a base value and a delta value associated with said tile.

9. The non-transitory computer-readable medium of claim 1, wherein said performing said interpolation comprises:
based on a difference among said group of indices, determining if said pixel is located at a horizontal edge or a vertical edge of said tile;
responsive to a determination that said pixel is located at said horizontal edge, performing non-linear interpolation on said group of indices to determine said interpolated index for said pixel; and
responsive to a determination that said pixel is located at said vertical edge, performing non-linear interpolation on said group of indices to determine said interpolated index for said pixel.

10. The non-transitory computer-readable medium of claim 1, wherein said first group of indices correspond to locations in multiple tiles.

11. A system comprising:
a processor; and
memory coupled to said processor and having stored therein instructions that, if executed by said computer system, cause said computer system to execute a method comprising:
accessing a first plurality of indices representing a tile of an image, wherein each index of said first plurality of indices corresponds to a respective location in said tile, wherein a total number of said first plurality of indices is smaller than a total number of pixels in said tile, and wherein further said first plurality of indices result from an index compression process on said plurality of pixels and are stored in a storage device; and
decompressing said first plurality of indices to determine color data of each pixel of said plurality of pixels, wherein said decompressing comprises:
determining a location of said pixel in said tile;
identifying a group of indices from said first plurality of indices based on said location of said pixel and further based on locations of said group of indices, wherein each of said group of indices corresponds to a different location;
performing interpolation on said group of indices to determine an interpolated index for said pixel;
using said interpolated index as an index to search a weight lookup table to determine a weight of said pixel, wherein said weight correspond to an interpolation weight that is calculated based on weights stored for said group of indices, wherein said group of indices correspond to locations neighboring said pixel; and
determining a color data of said pixel based on said weight.

12. The system of claim 11, wherein said performing interpolation comprises performing bilinear interpolation on said group of indices.

13. The system of claim 11, wherein said group of indices correspond to locations neighboring said pixel.

14. The system of claim 11, the method further comprising performing said index compression process on said plurality of pixels, wherein said index compression process comprises assigning a set of locations in said tile, wherein said first plurality of indices correspond to said set of locations.

15. The system of claim 14, wherein said set of locations coincide with pixel locations of said tile.

16. The system of claim 14, wherein said set of locations are partially or entirely offset from pixel locations of said tile.

17. The system of claim 16, wherein said index compression process further comprises determining said first plurality of indices based on pixels neighboring said set of locations.

18. The system of claim 11, herein said determining said color data is further based on a base value and a delta value associate with said tile.

19. The system of claim 11, wherein said performing said interpolation comprises:
based on a difference among said group of indices, determining if said pixel is located at a horizontal edge or a vertical edge of said tile;
responsive to a determination that said pixel is located at said horizontal edge, performing non-linear interpolation on said group of indices to determine said interpolated index for said pixel; and
responsive to a determination that said pixel is located at said vertical edge, performing non-linear interpolation on said group of indices to determine said interpolated index for said pixel.

20. The system of claim 11, wherein said first group of indices correspond to locations in multiple tiles.

* * * * *